Oct. 3, 1950

W. H. TRINDLE 2,524,407

WHEEL BALANCING MACHINE

Filed Aug. 6, 1946

INVENTOR
WM. H. TRINDLE.
BY
ATTORNEY

Oct. 3, 1950     W. H. TRINDLE     2,524,407
WHEEL BALANCING MACHINE

Filed Aug. 6, 1946     3 Sheets-Sheet 2

INVENTORS
WM. H. TRINDLE
BY
ATTORNEY

Oct. 3, 1950 W. H. TRINDLE 2,524,407
WHEEL BALANCING MACHINE
Filed Aug. 6, 1946 3 Sheets-Sheet 3
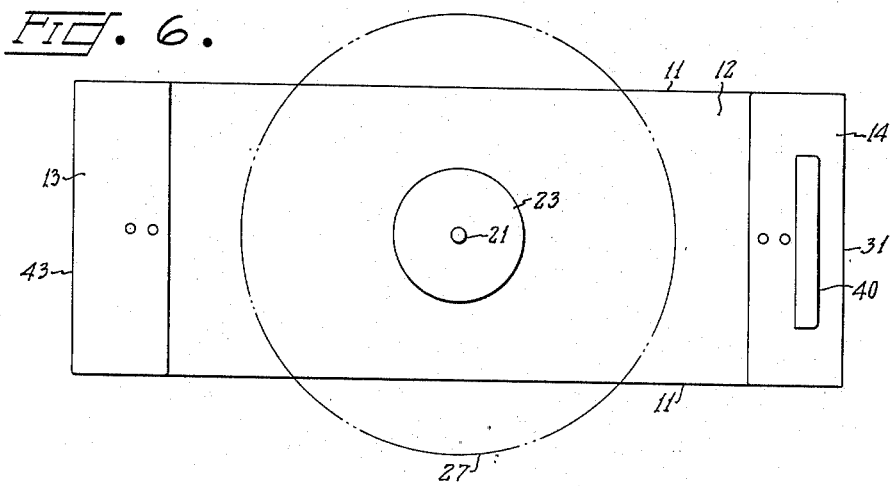
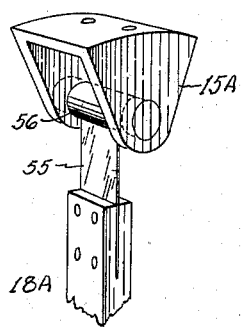
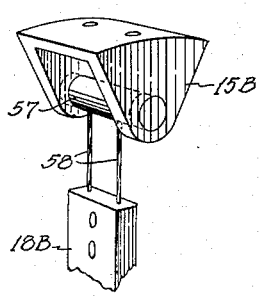
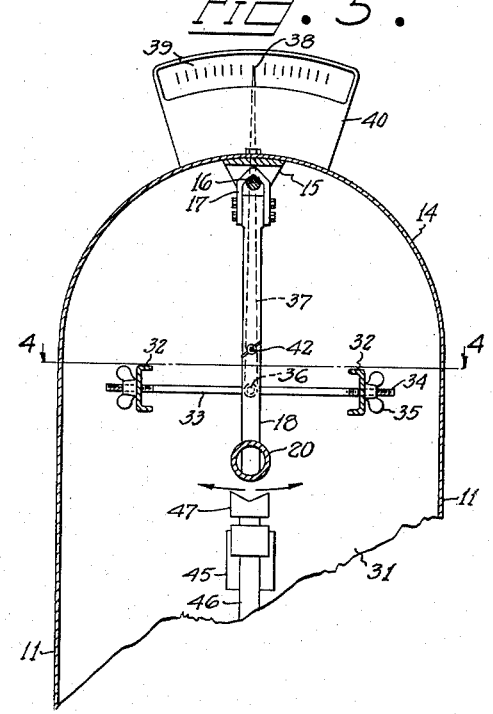
INVENTORS
WM. H. TRINDLE
BY
ATTORNEY Patented Oct. 3, 1950

2,524,407

UNITED STATES PATENT OFFICE 2,524,407

WHEEL BALANCING MACHINE

William H. Trindle, Salem, Oreg.

Application August 6, 1946, Serial No. 688,783

1 Claim. (Cl. 73—66)

This invention relates generally to the automotive industry and particularly to a wheel balancing machine.

The main object of this invention is to provide a simple and efficient form of a machine whereby an automobile wheel can be quickly and easily, as well as accurately, balanced.

The second object is to provide a machine of the class described, which will be adaptable for use with various sizes of wheels.

The third object is to provide a machine of the class described, in which a means is provided for protecting the device against shocks during the loading and unloading operations.

I accomplish these and other objects in a manner set forth in the following specification as illustrated in the accompanying drawings, in which:

Fig. 5 is a fragmentary section taken along the line 5—5 in Fig. 2.

Fig. 6 is a plan of the device.

Fig. 7 is a perspective view of a modified form of pivot.

Fig. 8 is a perspective view of a second modification of the pivot member.

Similar numbers of reference refer to the same or similar parts throughout the several views.

Figure 1:
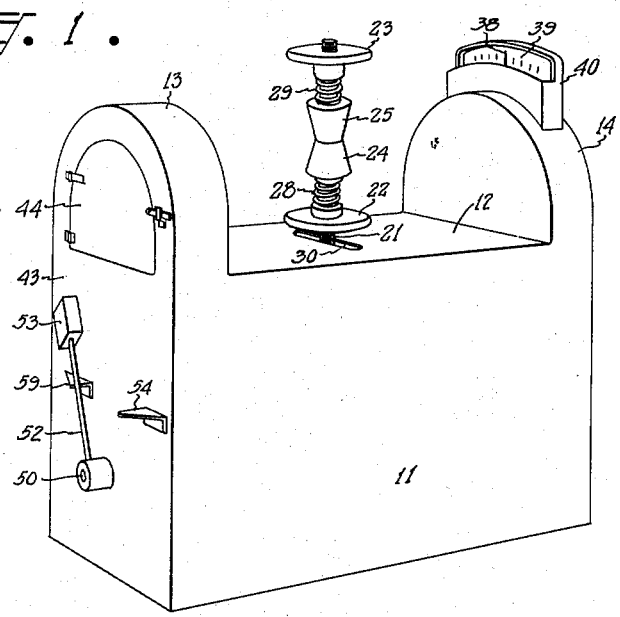
Fig. 1 is a perspective view of the machine.

Referring in detail to the drawings there is shown a pair of angular frame members 10, from which extend upwardly the vertical sides 11, to the horizontal top 12, which extends across the middle portion of the device, while the semi-circular curved portions 13 and 14 cover the ends of the device. Suspended from the portions 13 and 14 are the hangers 15, provided with the knife points 16, over which hang the straps 17, the straps 17, being secured to the rods 18, by means of the bolts 19. The rods 18, are attached to the scale beam 20, at the middle portion of which is secured the elongated screw 21, which occupies the plane passing through the knife points 16 and the longitudinal axis of the beam 20.

On the screw 21, is mounted the lower hand wheel 22, which is threaded upon the screw 21, and the upper hand wheel 23, which is also threaded upon the screw 21. Between the hand wheels 22 and 23 are the slidable cones 24 and 25 adapted to receive and center the hub 26, of the automobile wheel 27.

Springs 28 and 29 separate the hand wheels 22 and 23, from their respective cone members 24 and 25.

It will be noted that the screw 21, passes freely through the slot 30 in the top 12.

On the back 31 are secured the two brackets 32 between which is held in tension, a rod 33, on whose threaded ends 34, are placed the wing nuts 35.

The rod 33, is provided with a central pivot 36, on which is mounted an indicator arm 37, whose point 38, extends above the top of the member 14 in front of the calibrated scale 39, which is mounted in the raised extension 40, on the top side of the member 14. The purpose of this construction is to make possible the adjustment of the point 38 to the zero position on the scale 39. This is accomplished by adjusting the position of the rod 33 by means of the nuts 35 and therefore shifting the pivot center of the arm 37 and the relation which the point 38 bears to the scale 39 for a given position of the beam 20.

It is desirable to provide a door 41, on the back 31, to give access to the parts. Motion is transmitted from the rod 18, to the arm 37, by means of a pin 42, and it is desirable to position the pin 42, so that the motion will be multiplied at the point 38. Obviously the pin 42 must have sufficient freedom to permit its operation due to the opposite positions of the axes of the members 16 and 36. This is best accomplished by slotting the hole in the indicator arm 37 through which the pin 42 extends. Obviously the slot, though short, should be along the length of the arm 37.

The front 43, which is opposite the end 31, is also provided with a door 44.

The ends 31 and front 43 have mounted on the inner sides thereof, the double bearing guide 45, within which are mounted the slides 46 on the upper end of which is mounted a V-shaped head 47, which forms a saddle for the beam 20, when the slides 46 are raised. The purpose of the V-shaped heads 47 is to lift the weight of the wheel 27 and its support from the knife points 16. When raised the heads 47 prevent the beam 20 from revolving in a horizontal plane about the axis of the screw 21, when the wheel 27 is being mounted or dismounted and thereby injure the points 16 or the members 55 or 58.

The raising of the slides 46, is accomplished by means of links 48, which connect the lower ends of the slide 46, to the crank arms 49, which are pinned on the horizontal shaft 50, at opposite ends of the device.

The shaft 50 journals in the bearings 51, which are mounted on the back 31 and the front 43.

Secured on the outer end of the shaft 50, is a lever 52, at whose upper end is disposed a handle 53.

Figure 3:
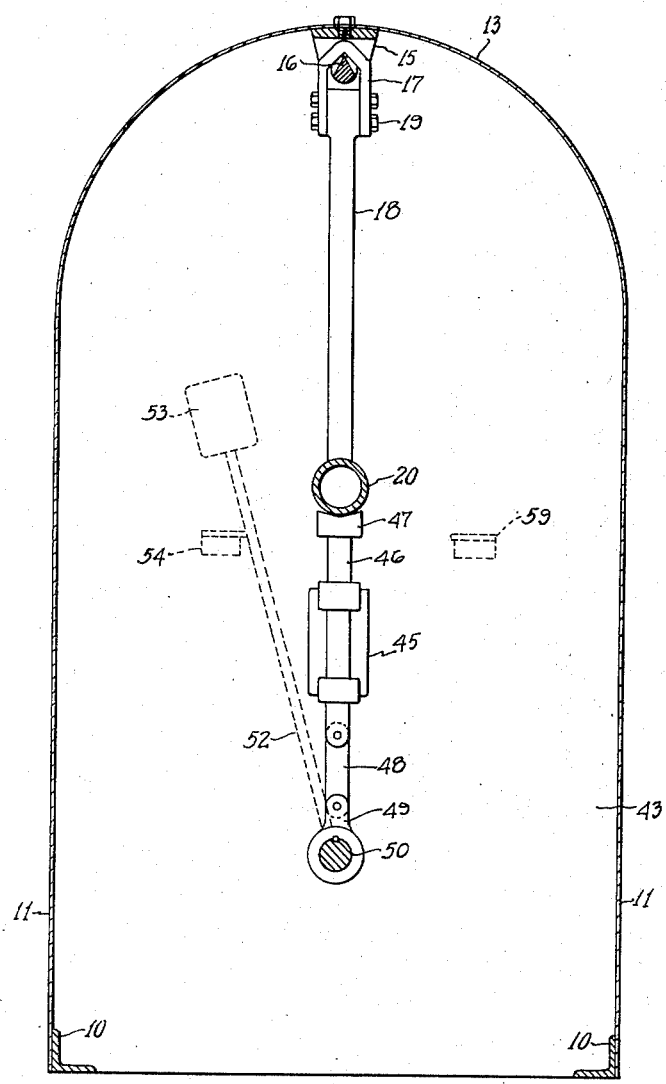
Fig. 3 is a transversed section taken along the line 3—3 in Fig. 2.
Figure 4:
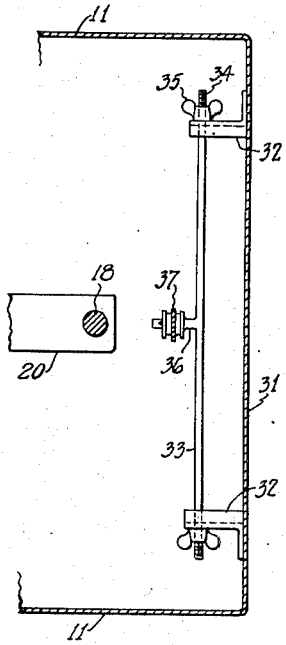
Fig. 4 is a fragmentary section taken along the line 4—4 in Fig. 5.

The lever 52, is limited in one direction to the position shown in dotted lines in Fig. 3, by means of a stop 54, which holds the crank arm 49, and links 48 in alignment with the axes of the slides 46, that is, holds the heads 47, in their uppermost positions, thereby holding the straps 17, out of engagement with their knife points 16, thereby preventing injury to the points 16, when a wheel 27, is being placed on or removed from the beam 20.

In Fig. 7 there is shown a modified form of a hanger 15—A, in which a flexible tape 55, is anchored in the cross pin 56, which is secured to the rod 18—A. The pin 56 does not move.

In Fig. 8 there is shown a further modification in which the hanger 15—B supports the cross pin 57, in which are anchored the flexible cables 58, the lower ends of which are attached to the rods 18—B. The pin 57 does not move.

The operation of the device is as follows:

Assuming that the parts are in the position shown in Fig. 3 that is, with the beam 20, supported by the V-shaped heads 47, and that it is desired to balance a wheel 27. It is first necessary to place the wheel upon the screw 21, between the cones 24 and 25 and by turning the hand wheels 23 and 22, adjust the pressure on the springs 28 and 29 in order to change the relative distance between the center of gravity of the wheel 27 and the axis of balance, that is, the line passing along the knife points 16.

Obviously a larger tire will require the cone 24 to be lower and a smaller tire would require it to be raised in order to maintain the critical relationship between the knife points 16 and the center of gravity.

It will be understood that the amount of difference will vary somewhat according to various factors and conditions, but as a rule, the center of gravity will be slightly below the center of balance which passes through the edges of the knife points 16.

The wheel 27, is now rotated manually and allowed to come to rest in various positions, about the circumference of the wheel in order that any unbalance of the wheel may rock the beam 20 and indicate the unbalancing on the scale 39 by means of the point 38.

Figure 2:
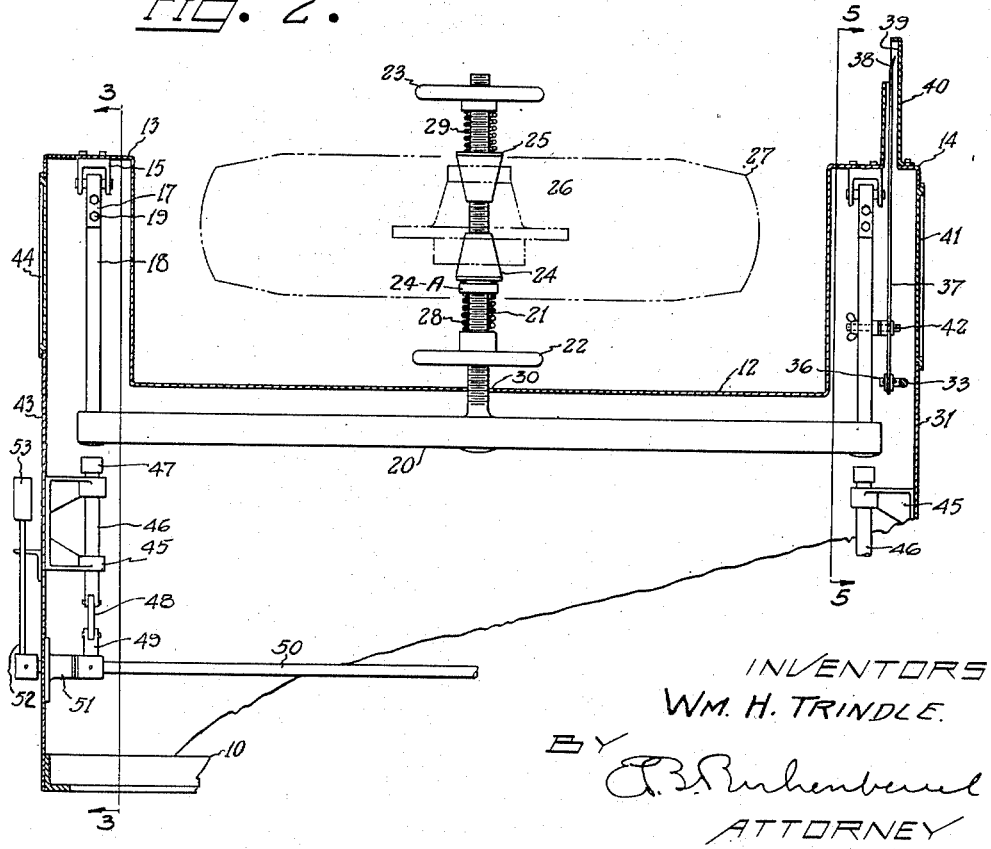
Fig. 2 is a fragmentary vertical longitudinal section through the machine.

It will be understood that in order to make this balancing test, the lever 52, must be moved to a position opposite that shown in Fig. 3, that is, against the stop 59, in which the heads 47 are free of the beam 20, as shown in Fig. 2.

It will be noted that the slidable cone 24, rests upon the end thrust bearing 24—A in order to permit the free rotation of the wheel 27, during testing periods.

It will also be noted that the V-shaped heads 47, support the scale beam 20, and protect the operating points thereof. A further function of the heads 47, is to hold the scale beam 20, against rotation in a horizontal plane passing through its axis as well as preventing the rotation of its scale beam 20, on its axis thereby providing ideal conditions for static and dynamic testing.

The three-fold function of the heads 47 consists first in raising the beam to protect the knife edges when a wheel is being put on the tester or being removed therefrom. The second function is to prevent the rotation of the beam in a horizontal plane as might be the case when the wheel was being rotated while frictionally held between the spring urged cones 24 and 25. The third function is to prevent the rocking of the beam on its own axis when such rocking is not desirable.

When the lever 52 is in the position shown in Fig. 3, the knife points are protected. When the lever 52 is against the stop 59, the device is in condition for a static balancing test.

I claim:

In a machine of the class described, the combination of a supporting frame having a pair of pivot points at the opposite end portions thereof near the top of said frame in horizontal alignment, pendant rods supported from said pivot points, a horizontal beam having its ends fixed to and supported by said pendant rods, a screw rigidly mounted on said beam between said rods normal to its length and in the same plane therewith, adapted to swing in a vertical plane when said beam is moved laterally, a pair of opposed sliding cones mounted on said screw, adapted to hold an automobile wheel therebetween, springs on the outer side of said cones and nuts on said screw adapted to regulate the pressure on said springs for the purpose of adjusting the center of gravity of a wheel held between said cones with relation to the pivot axis of said rods, and indicating means actuated by said beam for indicating the amount of unbalance of said wheel in any predetermined position.

WILLIAM H. TRINDLE.

REFERENCES CITED

The following references are of record in the file of this patent:

UNITED STATES PATENTS

| Number | Name | Date |
|---|---|---|
| 1,490,109 | Hort | Apr. 15, 1924 |
| 2,186,831 | Hem | Jan. 9, 1940 |
| 2,201,982 | Bazarek | May 28, 1940 |

FOREIGN PATENTS

| Number | Country | Date |
|---|---|---|
| 11,350 | Great Britain | of 1914 |
| 387,233 | Germany | Dec 21, 1923 |